Figure 1:
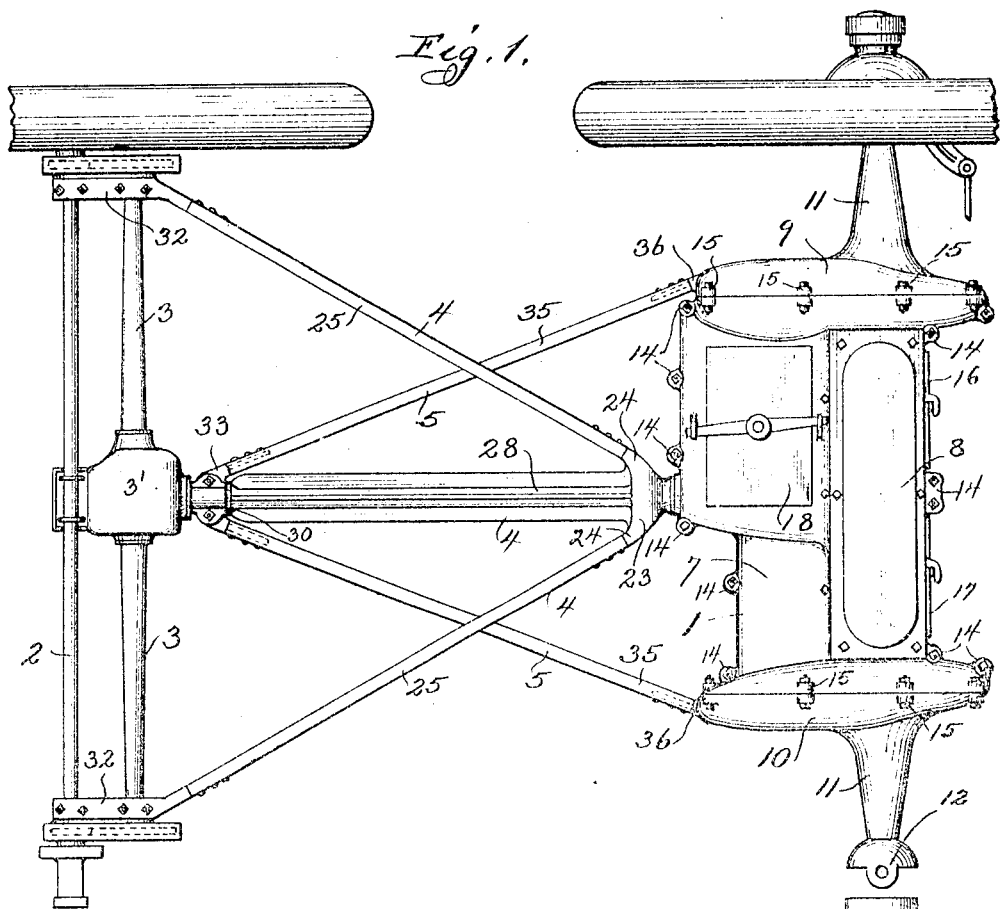

M. L. WILLIAMS.
RUNNING GEAR FOR AUTOMOBILES.
APPLICATION FILED DEC. 26, 1905.

906,481.

Patented Dec. 8, 1908.
2 SHEETS—SHEET 1.

Witnesses:
R. J. Jacker
Emilie Rose

Inventor:
Martin L. Williams,
By Albert N. Graves
Atty.

M. L. WILLIAMS.
RUNNING GEAR FOR AUTOMOBILES.
APPLICATION FILED DEC. 26, 1905.
906,481.
Patented Dec. 8, 1908.
2 SHEETS—SHEET 2.
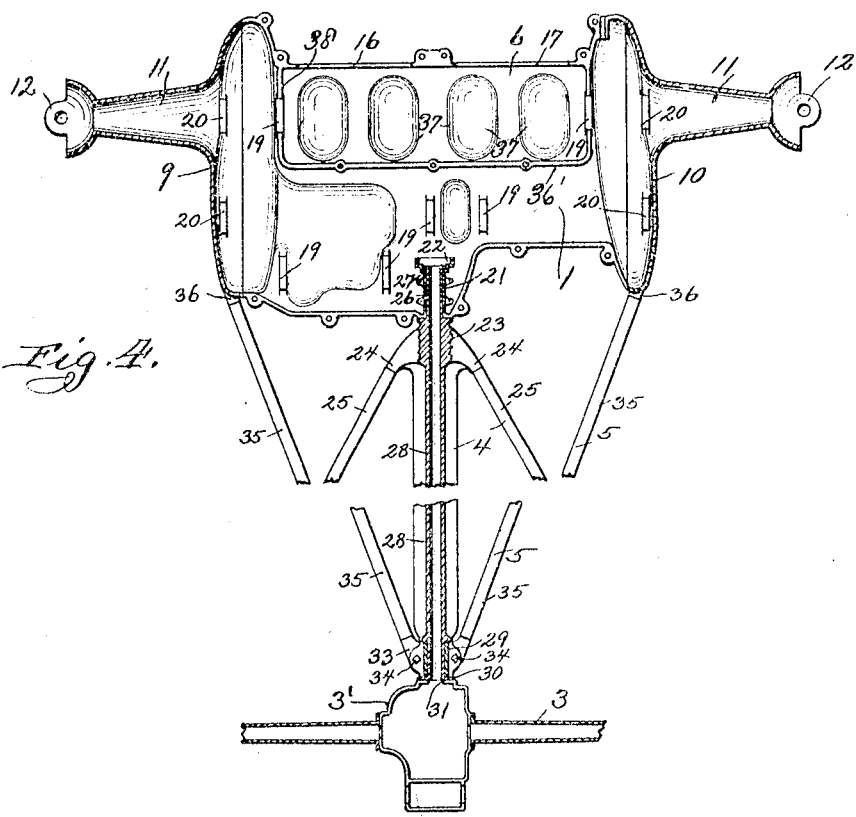
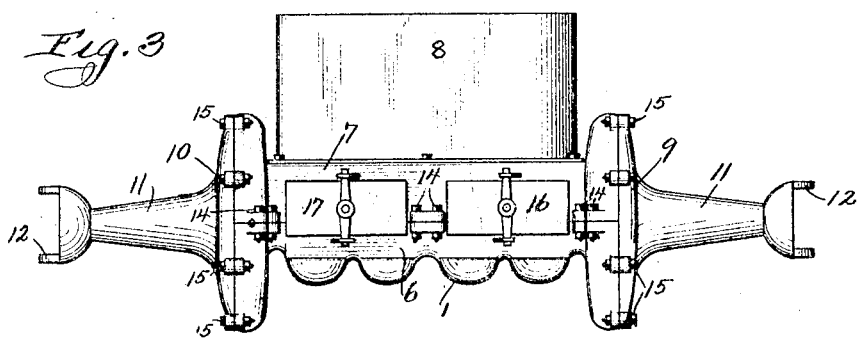

UNITED STATES PATENT OFFICE.

MARTIN L. WILLIAMS, OF SOUTH BEND, INDIANA.

RUNNING-GEAR FOR AUTOMOBILES.

No. 906,481.　　　　　Specification of Letters Patent.　　　Patented Dec. 8, 1908.

Application filed December 26, 1905. Serial No. 293,289.

*To all whom it may concern:*

Be it known that I, MARTIN L. WILLIAMS, a citizen of the United States, residing at South Bend, in the county of St. Joseph and State of Indiana, have invented certain new and useful Improvements in Running-Gears for Automobiles, of which the following is a specification.

This invention relates to improvements in running gears for automobiles, and it has among its salient objects to provide a construction in which the driving mechanism is supported upon what may be termed a double three-point suspension frame; to provide a construction in which the rear axle and connected parts are connected by a forwardly converging frame structure with the central portion of the front axle and its connected parts, and similarly the front axle and connected parts are united with the central portion of the rear axle and connected parts by a rearwardly converging frame structure, the two converging frame structures being arranged in overlapped relation; to provide in a structure having the characteristics last above stated, swiveling connections between the apex portion of each converging frame and the part with which it is connected; to provide in a structure having the characteristics set forth suitable propelling mechanism and a driving shaft extending axially through the apexes of both converging frames; to provide in a running gear for automobiles means for driving each of the four supporting wheels of the vehicle from a motor common to all, the frame structure and transmission drives being so constructed and arranged that each wheel may rise and fall without bringing torsional stresses upon any part of the running gear frame and without in any wise disturbing the freedom of movement of the driving system; to provide a running gear in which one of the main axles takes the form of a hollow casing forming a housing for the motor mechanism; to provide in such a structure improved details of construction and arrangement of the housing-axle; to so construct and arrange the frame structure that the counter shaft which drives the rear axle is substantially housed and the casing which incloses the same forms at once a housing for the shaft, a housing for a set of equalizing gears and supporting a traction frame member; to provide improvements in the details of construction and arrangement contributing to accessibility, to strength and rigidity, and to simplicity and neatness of appearance; and in general to provide an improved construction of the character referred to.

To the above ends the invention consists in the matters hereinafter described and more particularly pointed out in the appended claims.

The invention will be understood from the following description, reference being had to the drawings, in which—

Figure 2:
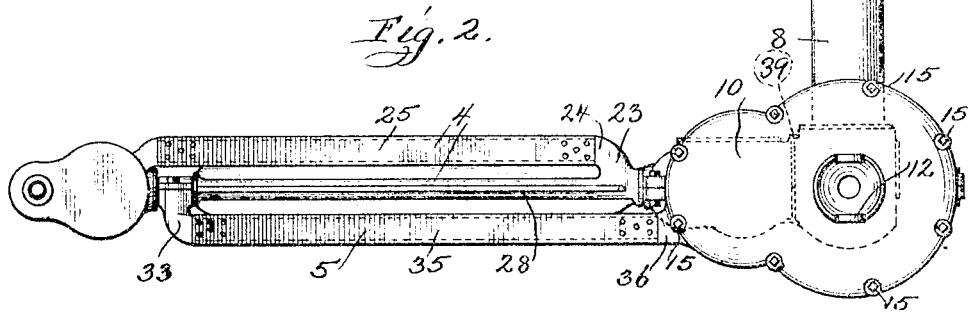

Figure 1 is a plan view of a running gear embodying my invention; Fig. 2 is an edge view or side elevation of the same; Fig. 3 is a front elevation of the running gear; Fig. 4 is a horizontal sectional view in the plane of separation of the front axle members.

Referring to the drawings, 1 designates as a whole the front axle member which is made in the form of a hollow casing and serves to substantially house the motor mechanism and parts of the transmission gear and will therefore be designated the housing-axle.

2 designates the rear axle, 3 a counter shaft housing frame or casing, and 4 and 5, respectively, two V-shaped frames arranged in overlapped relation and having their apex portions connected with the housing-axle and counter shaft casing, respectively.

The housing-axle, as preferably constructed, comprises a lower longitudinally extending flattened semi-tubular member 6, a corresponding upper member 7, which instead of being complete is shaped to fit around a vertically upstanding engine frame 8 which protrudes through the casing, and two end casings 9 and 10, respectively, which are connected with the ends of the tubular part of the casing formed by the lower and upper members 6 and 7 and are each provided with reduced and tapering axle extensions 11. These axle extensions terminate in the present instance in yokes, as indicated at 12, which form parts of the knuckle joints upon which the front wheels are mounted. The upper and lower housing members meet and are united with each other, desirably along an approximately horizontal plane, as indicated clearly in the drawings, and are conveniently fastened together by means of integral ears 14 through which are inserted bolts. The flattened semi-tubular shell formed by the members 6 and 7 is at each end enlarged to accommodate certain transmission mechanism, forming no part of the present invention; the end casings 9 and 10 being of corresponding size and configuration and being united to the cylindric shell by a series of bolts extending through registering ears, as indicated at 15. A more accurate understanding of the configuration of the housing-axle may be had by reference to the horizontal sectional view Fig. 3.

For convenience of access to the mechanism contained within the housing-axle, the latter is provided with removable door plates or closures, there being desirably two at the front side of the casing, as indicated at 16 and 17, and one at the upper side, located above the change-speed gears, as indicated at 18; all of these doors being removably secured in place. Moreover the construction of the upper semi-tubular member 7 is such that it may be detached from the other casing members and bodily lifted off so as to expose all mechanism contained in the shell, the operative mechanism of the vehicle being to this end mounted upon suitable bearings rising from the lower shell member 6, as indicated at the various parts designated 19, and from the lower sides of the end casings 9 and 10, as indicated at 20.

Centrally and at the rear side thereof, the upper and lower casing members are provided with registering internal semi-tubular bearings 21 which when the parts are assembled form an internal tubular bearing, the inner end of which is internally enlarged, as indicated at 22. Within the bearing this form is swiveled to the forward end of the V-shaped frame 4; the latter being to this end conveniently constructed with an apex casting 23 having lateral arms 24 with which are connected channel bars 25 which extend rearwardly and divergently to and are connected with the rear axle mechanism. A tubular extension 26 is rigidly mounted in said apex casting and forms the journal which extends within the journal sleeve 21; the inner end of said member 26 being headed or provided with an outturned flange which fits within the enlarged portion of the journal sleeve 22, as indicated at 27. The apex casting is also provided with a tubular extension 28 the bore of which is in axial alinement with the journal member 26, and which tubular extension extends rearwardly to a point adjacent to the casing member 3 and is there connected, as hereinafter described.

To effect the connection referred to, the extension 28 is provided with a reduced cylindrical journal portion 29 and externally of this bearing, with a head portion 30 which abuts against the front face of the gear casing 3' which forms a central enlargement of the counter shaft casing 3 hereinbefore referred to. Said front face of the gear casing is apertured, as indicated at 31, at a point in register with the bore of the extension 28, and the head 30 is bolted or otherwise suitably secured rigidly to said gear casing. The rear ends of the channel members 25 are connected with clips or cross bars 32 which overlie the rear axle 2 and end portions of the counter shaft casing and are rigidly bolted to the latter; the forwardly converging V-shaped frame 4 formed by these several parts being therefore rigid with the rear axle structure.

The oppositely disposed V-shaped frame 5 comprises a split casting head 33 the upper and lower halves of which fit around and are journaled upon the journal bearing 29 hereinbefore described; said upper and lower halves being conveniently united to each other by bolts, as indicated at 34, and channel members 35 which extend from the head 33 rearwardly and divergently to, and are connected with, suitable lugs 36 upon the rear sides of the end casings 9 and 10 of the housing-axle. The V-shaped frame last described has swiveling engagement with the journal 29 and, as will be obvious, is rigid with the front axle mechanism of the vehicle.

It will be understood from the foregoing description that the front and rear axles may oscillate freely independently of each other about an axis coincident with the longitudinal center of the journals 26 and 29. In order to provide for an oscillatory movement of considerable range, of the character referred to, the arms 24 of the apex casting 23 are elevated and the forward ends of the clips 32 similarly elevated so that the channels 25 lie in a plane considerably above the horizontal plane of the tubular reach extension 28, and in a similar manner the channels 35 are connected with the head casting 33 and rear sides of the housing-axle so as to lie in a plane considerably below said reach extension.

As a further feature of improvement I provide a partition 36' formed in part in the lower semi-tubular member 6 and in part in the corresponding upper member 7. This partition is formed by webs cast integrally with the respective members and arranged to divide the interior of the shell longitudinally at a point just in rear of the depressions 37 for the engine cranks; the ends of the longitudinally extending portion of the partition being deflected forwardly to meet the front wall, as indicated at 38. The formation of these partition webs is the same in the upper and lower members, and they register with each other and are secured together by means of tap-bolts inserted downwardly therethrough, as indicated in dotted lines at 39, Fig. 2. For convenience of construction the meeting edges of these partition webs are formed to lie in a plane coincident with the plane of separation of the shell members so that said parts may be fitted together accurately by face grinding. By such construction that part of the axle which contains the engine is completely inclosed and separated from the remainder of the interior of the axle, enabling the parts contained in this chamber to be kept bathed in oil.

I claim as my invention:

1. In a motor vehicle, the combination with front and rear axle structures of a shaft-housing arranged bodily to one side of and parallel with one of said axle structures, an extension frame having swiveling connections with the center of said shaft-housing and extending thence to and connected with the opposite axle structure at points laterally removed from the center of the latter, and a second frame extension having swiveling connections with the center of that axle structure remote from the shaft-housing, and extending thence to and connected with said shaft-housing, and adjacent axle structure at points laterally removed from the center of each.

2. In a motor vehicle, the combination with front and rear axle structures, of a shaft-housing arranged bodily to one side of and parallel with one of said axle structures, an extension frame having swiveling connections with the center of said shaft-housing and extending thence to and connected with the opposite axle structure at points laterally removed from the center of the latter, a second frame extension having swiveling connections with the center of that axle structure remote from the shaft-housing, and extending thence to and connected with said shaft-housing and adjacent axle structure at points laterally removed from the center of each, and supporting connections between the center of said shaft-housing and the center of the attached axle structure.

3. In a running gear for vehicles, an axle structure, comprising a central main body portion made in the form of a hollow shell divided into upper and lower shell members, and end portions taking the form of end casings which are united with, and close the ends of, the main central body, and are provided with reduced extensions for the reception of the wheels.

4. In a running gear for vehicles, an axle structure consisting of a hollow shell of tubular form, forming the principal length of the axle and longitudinally separable into upper and lower members, and end members fitted to and rigidly connected with the ends of said tubular structure, and provided with reduced extensions forming the wheel-receiving or spindle portions of the axle.

5. A hollow substantially closed vehicle axle, comprising a tubular central body separable into upper and lower halves detachably united with each other, end members each consisting of a single hollow casting detachably connected with the end margins of the tubular main body, wheel-supporting yokes upon the ends of said end members, and journal supports formed integrally with the lower half of said hollow axle upon the interior thereof.

6. A hollow substantially closed vehicle axle, comprising a tubular central body separable into upper and lower halves detachably united with each other, end members each consisting of a single hollow casting detachably connected with the end margins of the tubular main body, wheel-supporting yokes upon the end of said end members, and a journal socket formed in part in the upper main body casting and in part in the lower main body casting and arranged to extend at right angles to the longitudinal axis of the axle of the center of the latter; said journal socket opening to the exterior of the axle for the reception of the journal of an exterior member.

7. In a running gear for vehicles, an axle structure, comprising a central main body made in the form of a hollow shell divided into upper and lower shell members, and partition members in each of said shell members forming a supplementary chamber in the interior of said shell, said partition members being separably united at the meeting lines of the shell members.

MARTIN L. WILLIAMS.

Witnesses:
EMILIE ROSE,
FRANK L. BELKNAP.